Oct. 10, 1944.    C. F. WALLACE    2,359,812
TEMPERATURE RESPONSIVE TELEMETERING TRANSMITTER
Original Filed Dec. 31, 1941    2 Sheets-Sheet 1

INVENTOR.
Charles F. Wallace
BY Arthur L. Kent
his ATTORNEY

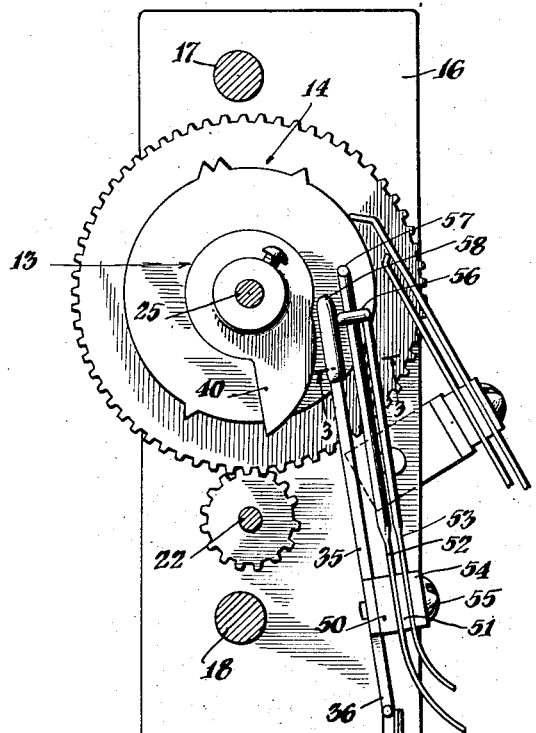
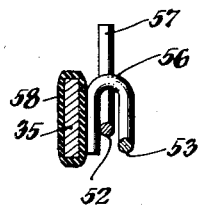
Fig. 2
Fig. 3

Patented Oct. 10, 1944

2,359,812

UNITED STATES PATENT OFFICE 2,359,812

TEMPERATURE-RESPONSIVE TELEMETERING TRANSMITTER

Charles F. Wallace, Westfield, N. J., assignor to Wallace & Tiernan Products, Inc., Belleville, N. J., a corporation of New Jersey Original application December 31, 1941, Serial No. 425,026. Divided and this application October 15, 1942, Serial No. 462,125

6 Claims. (Cl. 200—139)

This invention relates to temperature-responsive telemetering transmitters for radiometeorograph transmitting apparatus or radiosondes, that is, apparatus for the measurement of meteorological conditions through various levels of the atmosphere and radio transmission of the measurements to a receiver and recorder at a receiving station, and especially to temperature responsive telemetering transmitters intended for radiometeorgraph transmitters of comparatively light weight suitable to be carried by small sounding balloons either free or captive.

The object of the invention is to provide an improved temperature-responisve telemetering transmitter or device having the advantage of light weight, accuracy, reliability and ease of adjustment.

This application is a division of my application Serial No. 425,026, filed December 31, 1941, on which Patent No. 2,347,345, dated April 25, 1944, has been granted.

In the accompanying drawings which show an embodiment of the invention in the form now considered best:

Fig. 2 is a view of the temperature-responsive circuit controlling instrument taken on line 2—2 of Fig. 1; and Fig. 3 is an enlarged detail sectional view taken on line 3—3 of Fig. 2.

Figure 1:
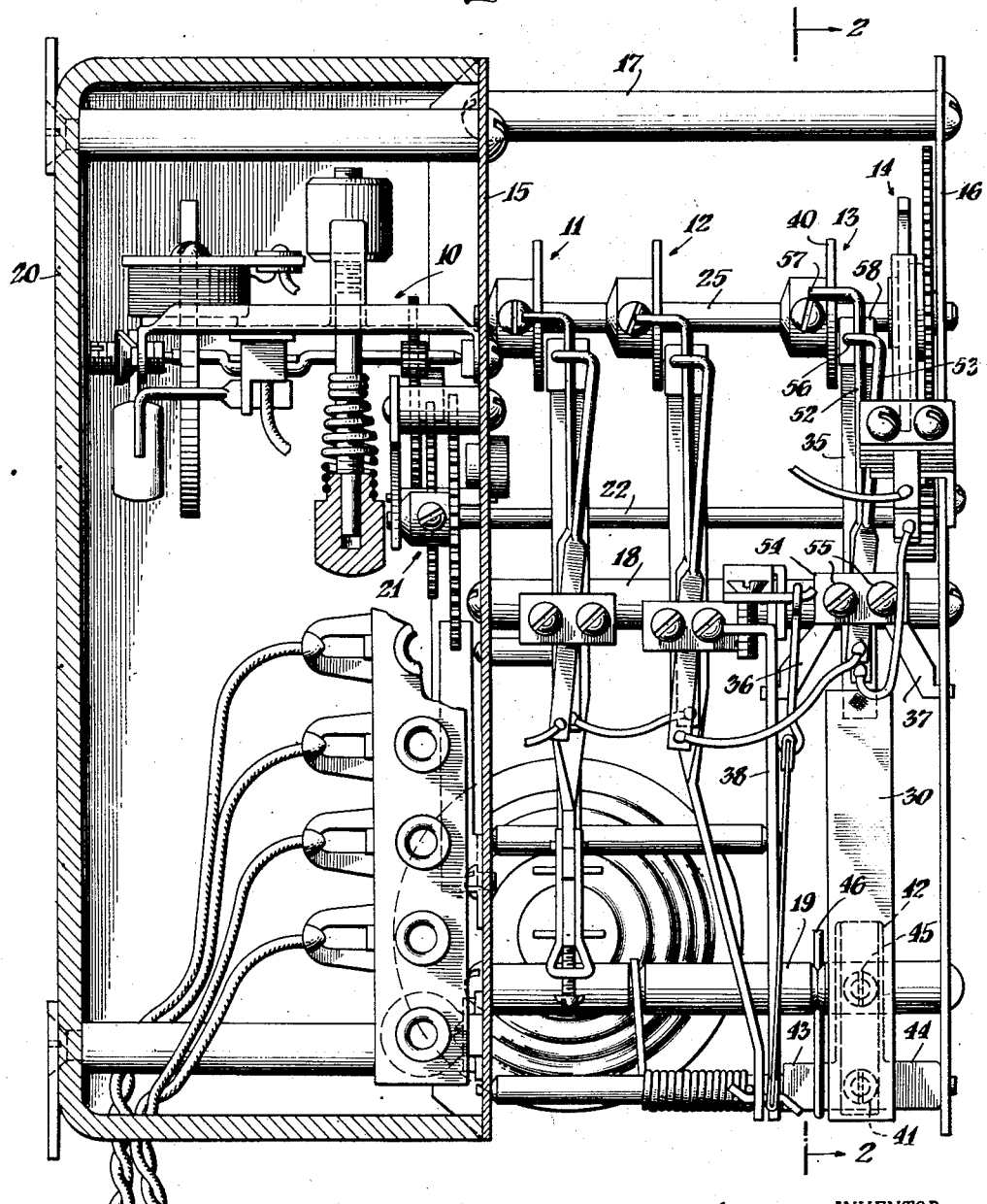
Fig. 1 is a side view of the apparatus parts and their mountings of the meteorological transmitter of my said original application Serial No. 425,026, which includes a temperature-responsive circuit-controlling device, or telemetering transmitter, according to the invention forming the subject matter of the present application.

The meteorological transmitter shown by Fig. 1 comprises a driving motor 10, three meteorological circuit-controlling instruments or telemetering transmitters, that is, a pressure-responsive instrument 11, a humidity-responsive instrument 12, a temperature-responsive instrument 13, and an indexing circuit-controlling device 14. The mounting structure for these apparatus parts comprises a support plate 15 on one side of which the driving motor 10 is mounted and a plate 16 spaced off from the other side of the plate 15 by means of spacing posts 17, 18 and 19 extending between the plates, the circuit-controlling instruments and the indexing circuit-controlling device being mounted side by side between these two plates and the motor being enclosed by a light weight casing 20 secured to the plate 15. The motor drives, through a train of reduction gearing 21, a shaft 22 from which a shaft 25 which carries the cams of the circuit-controlling instruments and of the indexing device is driven. This complete unitary structure is adapted to be housed in a suitable casing to form part of a complete radiometeorograph transmitter.

The only part of this meteorological transmitter with which the invention of this application is concerned is the temperature-responsive circuit-controlling instrument 13. Therefore, no further description need be given of the other parts shown in Fig. 1, all of which are fully described in my said original application Serial No. 425,026, and features of which are claimed in said application and in other divisions of said application. The temperature-responsive device which forms the subject matter of the present application, which appears in Fig. 1 and is further illustrated in Figs. 2 and 3, will now be described.

This temperature responsive instrument or device as shown comprises a temperature-responsive element 30 consisting of a thin bi-metallic plate or strip rigidly spot-welded or otherwise rigidly connected to the inner end of a support bar 35 which carries a contact assembly. The support bar 35 is pivotally mounted by means of arms 36 and 37 the reduced ends of which extend into pivot openings one in the plate 16 and the other in a plate 38 mounted on the posts 18 and 19. The contact assembly is operated by a cam 40 of non-conducting material on the shaft 25. The other end of the bi-metallic strip 30 is free except that as it flexes under drop in temperature it bears against an adjustable abutment formed by a screw 41 carried by a pivoted member 42. Member 42 is formed by a metal strip bent to generally U-shape, one of its arms being curved to clear the post 19 and having lateral extensions 43 and 44 at its ends which have reduced ends extending into pivot openings in the plates 38 and 16 respectively. The screw 41 is threaded through the two ends of the strip forming the member 42, these ends being spaced apart as shown in Fig. 2. A screw 45 carried by post 19 holds member 42 against being turned in anti-clockwise direction as viewed in Fig. 2 by a spring 46 which is rigidly secured to the end extension 43 and bears against post 19.

Referring now to the contact assembly carried by the support bar 35: Near the inner end of the support bar there is mounted a plate 50 of insulating material, and between this plate and a similar plate 51 is secured the flattened end of a spring contact rod or wire 52 preferably of silver or other rare metal. Another similar contact rod or wire 53 has its flattened end clamped between the insulating plate 51 and a third plate 54 of insulating material, the three plates being clamped together by means of screws 55, the contact rods thus being adjustable longitudinally on loosening the screws 55. The free end of rod 53 is bent transversely and then over to form a U as indicated at 56, thus providing in effect two spaced contact terminals. The free end of rod 52 extends through the U-form end 56, and beyond 56 it is bent at right angles to form a cam-engaging end 57.

The two contact rods 52 and 53 are tensioned so that when not engaged by the cam 40 the end of rod 53 rests on the end of the support bar 35 which is provided with an insulating coating 58, and the end of rod 52 rests on the lower arm of the U-form end of rod 53, as appears best in Fig. 3. When the cam 40 in its revolution makes contact with the cam-engaging end 57 of contact rod 52, the rod is raised out of engagement with the lower arm of the U end of rod 53, thus opening the circuit at this point; and then as the revolution of the cam continues, the rod 52 is quickly raised further into engagement with the upper arm of the U end of rod 53, thus re-establishing contact between the two contact rods, and thereafter rods 52 and 53 are moved together until the high point of the cam passes beyond the end 57 of rod 52, whereupon the rods return to their position of rest on the end of the support bar. Contact between the two rods 52 and 53 is thus interrupted for a very short period, say a second or less, during each operation of the operating cam 40 while rod 52 is moved by the cam from the lower arm to the upper arm of the U-form end of rod 53. Therefore, the transmitter circuit is opened momentarily at some time during the rotation of the cam, and the time in each rotation of the cam, that is, the position in time in each successive cycle of the operation of the device at which interruption occurs, depends on the angular motion imparted to the support bar 35 by the bi-metallic strip 30.

By means of the screw 45 the member 42 may be adjusted angularly to move the abutment end of screw 41 longitudinally of the bi-metallic strip 30, thereby changing the effective length of the strip and, therefore, the magnitude of the movement imparted to the contact assembly by this temperature-responsive strip or element for a given temperature change, this being the range adjustment whereby the spread on the recorder chart at the receiving station of the data markings indicating temperature change is determined and varied as desired. Adjustment for positioning the time in the cycle of operations at which the contact assembly of this instrument is operated by the cam for any temperature condition of the atmosphere, thereby determining the time in each cycle of operations at which the temperature signals are transmitted, and, therefore, the position of the range of pressure markings on the recorder chart, is effected by adjustment of the screw 41. The time in the cycle at which the signal is transmitted by this instrument depends on the relative resistance to flexure of the bi-metallic strip 30 and the contact spring 52 of the contact assembly, opening of the circuit by engagement of the cam 40 with the end 57 of contact rod 52 taking place only when the resistance of the bi-metallic strip exceeds that of the contact rod. The range of the data markings on the chart will, of course, depend primarily on the effective peripheral length of the cam, and the location on the chart of the data markings will depend primarily on the angular position of the cam, fine adjustment for range and position of the data markings being by means of the screws 45 and 41.

The new temperature-responsive teletering instrument, having its bi-metallic strip rigidly connected to the inner end of a pivoted arm which carries the contact assembly and its other end free and merely engaging an adjustable abutment, has the advantage that the contact assembly has a shorter movement for a given flexure of the bi-metallic strip than in the temperature-responsive instrument of my co-pending patent application Serial No. 327,767, filed April 4, 1940, on which Patent No. 2,347,160, dated April 18, 1944, has been granted. The bi-metallic strip may, therefore, be longer and thinner, giving greater sensitivity of response. And as the bi-metallic strip is not under sufficient tension to have a pronounced natural period, vibration under shock is avoided. Also, the range adjustment by adjusting the abutment lengthwise of the bi-metallic strip to change the effective length of the strip is less critical than the corresponding adjustment of the former instrument. Apparatus according to the present invention embodies features of invention claimed in my said application Serial No. 327,767.

What is claimed is:

1. A telemetering transmitter, comprising a pivotally mounted support, a motor-driven rotary cam, a contact assembly comprising two relatively movable members carried by said support for coacting with said cam, a temperature-responsive element formed by a bi-metallic strip rigidly secured at one end to said support, and an abutment positioned for engagement by the free end of said strip.

2. A telemetering transmitter, comprising a pivotally mounted support, a motor-driven rotary cam, a contact assembly comprising two relatively movable members carried by said support for coacting with said cam, a temperature-responsive element formed by a bi-metallic strip rigidly secured at one end to said support, and an abutment positioned for engagement by the free end of said strip, said abutment being adjustable longitudinally of the strip for varying the magnitude of movement imparted to the contact assembly for a given temperature change.

3. A telemetering transmitter, comprising a pivotally mounted support, a motor-driven rotary cam, a contact assembly comprising two relatively movable members carried by said support for coacting with said cam, a temperature-responsive element formed by a bi-metallic strip rigidly secured at one end to said support, and an abutment positioned for engagement by the free end of said strip, said abutment being adjustable toward and from the end of the strip for varying the time of operation of the contact assembly by the cam.

4. A telemetering transmitter, comprising a pivotally mounted support, a motor-driven rotary cam, a contact assembly comprising two relatively movable members carried by said support for coacting with said cam, a temperature-responsive element formed by a bi-metallic strip rigidly secured at one end to said support, and an abutment positioned for engagement by the free end of said strip, said abutment being adjustable longitudinally of the strip for varying the magnitude of movement imparted to the contact assembly for a given temperature change and being adjustable toward and from the end of the strip for varying the time of operation of the contact assembly by the cam.

5. A telemetering transmitter, comprising a pivotally mounted support, a motor-driven rotary cam, a contact assembly comprising two relatively movable members carried by said support for co-acting with said cam, a temperature-responsive element formed by a bi-metallic strip rigidly secured at one end to said support, a pivotally mounted member, and an abutment carried by said member in position for engagement by the free end of said bi-metallic strip and adjustable toward and from the end of the strip for varying the time of operation of the contact assembly by the cam, said member being angularly adjustable for adjusting the abutment longitudinally of the strip for varying the magnitude of movement imparted to the contact assembly for a given temperature change.

6. A telemetering transmitter as claimed in claim 5, in which the pivotally mounted member is formed by a spring metal strip bent to U-form, the abutment is formed by the end of a screw through the two arms of the U which are held under tension by the screw to lock the screw, and the pivoted member extends in a direction lengthwise of the strip and has its pivotal axis spaced away from the abutment and is adjustable angularly by an adjusting screw which holds the member against the tension of a spring, thereby to effect the adjustment of the abutment longitudinally of the strip.

CHARLES F. WALLACE.